United States Patent
Joshi et al.

(10) Patent No.: US 7,509,310 B1
(45) Date of Patent: Mar. 24, 2009

(54) ONLINE RELOCATION OF LDAP ENTRIES AND SUBTREES IN DISTRIBUTED DIRECTORY ENVIRONMENT

(75) Inventors: Chandrajit Gangadhar Joshi, Pune (IN); Romil J. Shah, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/126,149

(22) Filed: May 23, 2008

(51) Int. Cl.
*G07F 17/30* (2006.01)

(52) U.S. Cl. .................. 707/3; 707/1; 707/2; 707/5; 707/7; 707/100; 707/101; 707/200; 707/202; 707/203; 707/204; 709/217; 709/218; 709/219; 709/223; 709/226; 709/233

(58) Field of Classification Search ............... 707/1, 707/2, 3, 5, 7, 100, 101, 200, 202, 203, 204; 709/217, 218, 219, 223, 226, 233
See application file for complete search history.

(56) References Cited

U.S. PATENT DOCUMENTS

| | | | |
|---|---|---|---|
| 5,832,487 A | 11/1998 | Olds et al. | |
| 5,956,718 A | 9/1999 | Prasad et al. | |
| 6,105,062 A * | 8/2000 | Andrews et al. | 709/223 |
| 6,324,571 B1 | 11/2001 | Hacherl | |
| 6,347,312 B1 * | 2/2002 | Byrne et al. | 707/3 |
| 6,615,223 B1 | 9/2003 | Shih et al. | |
| 6,629,105 B1 | 9/2003 | Young et al. | |
| 6,915,287 B1 | 7/2005 | Felsted et al. | |
| 7,016,945 B2 | 3/2006 | Bellaton et al. | |
| 7,133,833 B1 | 11/2006 | Chone et al. | |
| 7,310,650 B1 | 12/2007 | Felsted et al. | |
| 7,315,854 B2 | 1/2008 | Kumar | |
| 2002/0112022 A1 | 8/2002 | Kazar et al. | |
| 2002/0138489 A1 | 9/2002 | Trivedi et al. | |
| 2002/0174225 A1 | 11/2002 | Smith et al. | |
| 2003/0088587 A1 | 5/2003 | Merrells et al. | |
| 2003/0088614 A1 | 5/2003 | Bellaton et al. | |
| 2004/0002955 A1 | 1/2004 | Gadbois et al. | |
| 2004/0117667 A1 | 6/2004 | Lavender et al. | |
| 2005/0102297 A1 | 5/2005 | Lloyd et al. | |
| 2005/0278385 A1 | 12/2005 | Sutela et al. | |
| 2006/0089925 A1 * | 4/2006 | Kumar | 707/3 |
| 2006/0248117 A1 | 11/2006 | Bell et al. | |

OTHER PUBLICATIONS

OpenLDAP 2.2 Administrator's Guide: LDAP Sync Replication, http://www.openldap.org/doc/admin22/syncrepl.html, pp. 1-7, Dec. 17, 2007 (using www.archive.org).*
Web search: Project details for ldapsync.pl. http://freshmeat.net/projects/ldapsync/, pp. 1-3. [May 12, 2008].
Web search: OpenLDAP 2.2 Administrator's Guide: LDAP Sync Replication, http://www.openldap.org/doc/admin22/syncrepl.html, pp. 1-7. [May 20, 2008].

* cited by examiner

*Primary Examiner*—Christian P. Chace
*Assistant Examiner*—Farhan M Syed
(74) *Attorney, Agent, or Firm*—Saidman DesignLaw Group

(57) ABSTRACT

A method for online automatic relocation of LDAP entries and subtrees in a distributed directory environment. The online relocation method is for homogeneous LDAP directory partition servers where source and target partition servers have the same schema rules and definitions. When the method is to be applied in a directory environment where servers have different set of schema, then a "rules file" or a "policies file" that contains mapping of schema attribute-value pairs and objectclasses of a source directory server with the schema attribute-value pairs and objectclasses of a destination directory server should be supplied to the relocation tool.

1 Claim, 2 Drawing Sheets

ONLINE RELOCATION OF LDAP ENTRIES AND SUBTREES IN DISTRIBUTED DIRECTORY ENVIRONMENT

BACKGROUND OF THE INVENTION

1. Field of the Invention

The present invention generally relates to a method of automatically relocating an a lightweight directory access protocol (LDAP) entry and a subtree across directory partitions from one backend partition server to another. More specifically, the relocation is performed without bringing any of the servers down and by creating, formatting and modifying an equivalent entry with a distinguished name on a target partition server.

2. Description of the Related Art

In a typical distributed directory environment, there are several directory servers; each may correspond to an organization under an organizational umbrella or to an organizational unit within an organization. Hence each server may be associated with one or more LDAP suffixes. The LDAP is a directory service protocol that runs over Transmission Control Protocol/Internet Protocol (TCP/IP). To give an LDAP server the capability to manage part of an LDAP directory, the highest level parent distinguished names is specified in the configuration of the server. A distinguished name that represents the root level of a directory is called a suffix. Suffixes can be (1) a character string attached to the end of a file name that helps identify its file type; (2) a code dialed by a caller who is already engaged in a call; or (3) a part of a file name, added at the end, separated from other suffixes or the base file name by some punctuation, such as a period (.). A lower-level directory structure is called a subtree.

For example, a Backend Partition1 is associated with suffix "O=IBM,C=US", a Backend Partition2 is associated with suffix "O=IBM,C=IN" and a Backend Partition3 is associated with suffix "O=IBM,C=JP". A Replica1 is associated with suffix "OU=BLR,O=IBM,C=IN" and is a read only replica of Partition2. Replica2 is associated with suffix "OU=PUNE, O=IBM,C=IN", and so on. The LDAP server can access all objects in the directory that are below the specified suffix in the directory hierarchy. The LDAP directory service is based on entries/objects. LDAP refers to entries with Distinguished Names (DNs). Distinguished names consist of the name of the entry itself as well as the names, in order from bottom to top, of the objects above it in the directory.

To provide a single view of all these distributed servers, there may be a proxy server that provides a single point of contact for all the LDAP clients. When an LDAP client sends a request to the LDAP proxy server, it forwards the request to the appropriate partition server and gets the response back that is then sent back to the client.

In such an environment there are continuous changes in the organizational structure, for example:

- Employees are transferred from one organization or organizational unit to another organization or organizational unit;
- Ownership of organizational units change; and
- Mergers and acquisitions.

Hence, individual LDAP entries or whole subtrees are relocated from one partition server to another. This involves manual operations and intervention and may involve downtime as well.

SUMMARY OF THE INVENTION

One embodiment of the present invention provides for a method and system of automatically relocating an LDAP entry and a subtree across directory partitions from one backend partition server to another server without bringing any of the servers down, and by creating, formatting and modifying an equivalent entry with a distinguished name on a target partition server.

Entries in a source partition server may be searched, but cannot be updated during a relocation process.

Newly formatted equivalent LDAP entries are created for each LDAP entry obtained during a local search operation. The creation of new equivalent entries includes modifying a distinguished name (DN) of the LDAP entries in accordance with a target location of the equivalent LDAP entry in a target partition server; and adding attribute-value pairs in the equivalent entry in accordance with the attribute-value pairs in the LDAP entries in the source partition server and schema rules of the target partition server.

If the scope of relocation is root, then a suffix entry is updated as a newly added suffix subtree in a configuration of the target partition server and dynamic updates of the configuration are issued so that the newly added suffix subtree becomes active.

Furthermore, embodiments of the present invention can be directed to a system and associated apparatuses including multiple servers, protocols and client apparatuses. In addition, embodiments of the present invention can also be implemented as a program causing a computer to execute the above-described steps. The program can be distributed via a computer-readable storage medium such as a CD-ROM.

DETAILED DESCRIPTION OF EMBODIMENTS OF THE INVENTION

Figure 1:
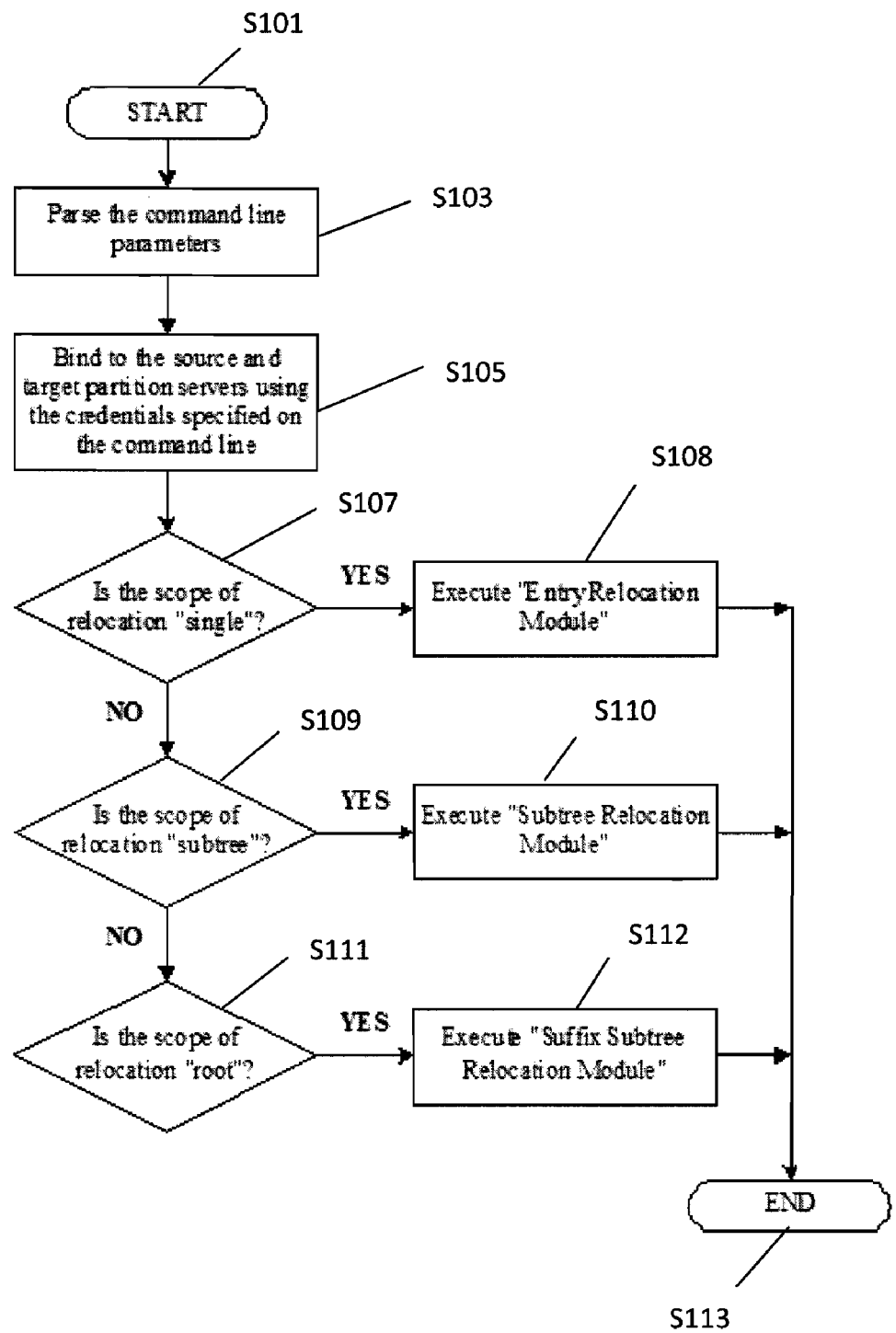
FIG. 1 is a flowchart of a method according to an embodiment of the invention.

In the description that follows, numerous details are set forth in order to provide a thorough understanding of the present invention. It will be appreciated by those skilled in the art that variations of these specific details are possible while still achieving the results of the present invention. Well-known elements and processing steps are generally not described in detail in order to avoid unnecessarily obscuring the description of the present invention.

In the drawings accompanying the description that follows, often both reference numerals and legends (labels, text descriptions) may be used to identify elements. If legends are provided, they are intended merely as an aid to the reader, and should not in any way be interpreted as limiting.

DEFINITIONS OF KEY TERMS

This section provides definitions of all the important terms described below.

Leaf Entry: An LDAP entry that does not have any child entries under it.

Non-leaf Entry: An LDAP entry having child entries.

lockEntry Extended Operation, or lockEntry ExOp: An ExOp request sent by a relocation tool to a backend partition server to lock a specified entry or subtree. Two types of lock will be supported:
1. Write lock—With this type of lock an LDAP entry or subtree will be locked for any modification or deletion by other LDAP clients. However, a SEARCH request on the entry will still be allowed, but updating will not be allowed.
2. ReadWrite lock—With this type of lock an LDAP entry or subtree will be locked for all kinds of operations, including SEARCH by other LDAP clients.

The ExOp request will also provide a "remove" option to support removal of lock from the specified entry or subtree.

These locks are specially introduced for the relocation method. Hence, the method is able to delete the locked entries.

An embodiment of this invention provides a method to relocate:
1. Individual LDAP entries
2. Subtrees—For example, a subtree that resides in one partition under a main suffix can be relocated to other partitions under a corresponding suffix
3. Entire subtree associated with a suffix entry—For example, the whole subtree under a suffix can be relocated to other partitions as an independent subtree.

First, an individual LDAP entry/subtree is read from a source partition server. Next, an equivalent LDAP entry/subtree is created. Then the LDAP entry/subtree is added in the target partition server. Finally, the LDAP entry/subtree is deleted from the source partition server.

This method provides auto-relocation of the LDAP entries and subtrees, and hence no manual intervention is needed, which leads to time saving. Further, relocation may be done online, and hence no downtime of servers will be experienced by LDAP clients.

This method involves developing a relocation method and changes in a backend server to support processing for "lockEntry" extended operation.

This relocation method binds to both a source partition server and a target partition server using the credentials of a special administrator who has a "Relocation Administrator" role. This administrator should be present with both the source partition server and the target partition server, and the credentials with both of them should be the same. The administrator has very limited "admin" rights that include:
1. Locking the entries/subtrees in the source partition server using "lockEntry Write" ExOp
2. Reading and deleting entries/subtrees from the source partition server
3. Adding entries/subtrees in the target partition server under any subtree or as an independent subtree
4. Locking entries/subtrees in the target partition server using "lockEntry ReadWrite" ExOp
5. Adding a suffix entry in the configuration file of target partition server and issuing an ExOp request for dynamic updates of the suffix entry within the server so that a configuration of the newly added suffix subtree becomes active in the target partition server.

Assigning a "Relocation Administrator" role to an administrator account will give an administrator the above-mentioned admin rights.

If a single entry is to be relocated from one partition to another, the entry should be a leaf entry, because deletion of a non-leaf entry from the source partition server when the relocation is done to a target (destination) partition server will not be allowed by the source partition server. This is a normal behavior of any directory server. Hence, if a non-leaf entry is to be relocated, the directory administrator should ensure that all the sub-entries under it are shifted so that it becomes a leaf entry.

A way of invoking the relocation method using command line parameters is given below:
ldapreloc-D<Relocation admin DN>-w<Relocation admin PW>-s<source url>-t<target url>-S<source entry DN>-T<target entry DN>-scope<scope of relocation>
Where
Relocation admin DN: is the DN of relocation administrator,
Relocation admin PW: is the password of relocation administrator.
source url: is the LDAP URL of the source partition server, of the form ldap://<hostname>:<port>
target url: is the LDAP URL of the target partition server, of the form ldap://<hostname>:<port>
scope of relocation: the value would be "single", "subtree" or "root". If "single" is specified, only a single entry will be relocated. If "subtree" is specified, the whole subtree will be relocated. If "root" is specified, it indicates that the subtree starting from the root entry of the suffix is to be relocated (for example, a partial subtree). A suffix entry is updated as a newly added independent suffix subtree in a configuration of the target partition server and dynamic updates of the configuration is issued so that the newly added independent suffix subtree becomes active.
source entry DN: In case of scope "single", this would be the DN of the entry to be relocated. In case of "subtree" and "root", this would be the DN of the parent or root entry of the subtree.
target entry DN: The DN of the entry in the target partition server under which the entry in source partition server is to be relocated.

Accordingly, individual leaf entries can be relocated from a source subtree to a destination subtree.

A flowchart for the processing logic according to the method of an embodiment of the present invention is shown with reference now to FIG. 1.

In addition to starting (S101) and ending (S113), the control flow of the method is as follows:
1. Parse the command line parameters (S103)
2. Bind to the source and target partition servers using the credentials specified on the command line (S105)
3. If the scope of relocation is "single" (S107), execute "Entry Relocation Module" (S108)
4. Else, if the scope of relocation is "subtree" (S109), execute "Subtree Relocation Module" (S110)
5. Else, if the scope of relocation is "root" (S111), execute "Suffix Subtree Relocation Module" (S112)

Entry Relocation Module

The control flow of this module is as follows:
1. Lock the entry in the source partition server using "lockEntry Write" ExOp to disallow any modification (updates) to or deletion of the entry to be relocated by any other LDAP clients while its relocation is in progress
2. Read the locked entry from the source partition server by acting as a normal LDAP SEARCH client
3. Create an equivalent entry structure for adding in the target partition server that is same in all aspects as the entry to be relocated. The difference would only be in the DNs. So for example, if an entry having DN as CN=XYZ,O=IBM,C=US is to be relocated under entry having DN OU=PUNE, O=IBM,C=IN, then the DN of entry that will be created will be CN=XYZ,OU=PUNE,O=IBM,C=IN
4. Add the newly created entry in the target partition server 5. Lock the newly added entry in target partition server using "lockEntry ReadWrite" ExOp to disallow search/modification/deletion of the entry until relocation is complete 6. Delete the source entry 7. Remove the lock on the target entry using "lockEntry remove" ExOp Creating a newly formatted equivalent LDAP entry includes modifying the distinguished name (DN) of one of the plurality of entries in accordance with a target location of one of the plurality of entries in the target partition server.

Subtree Relocation Module

Figure 2:
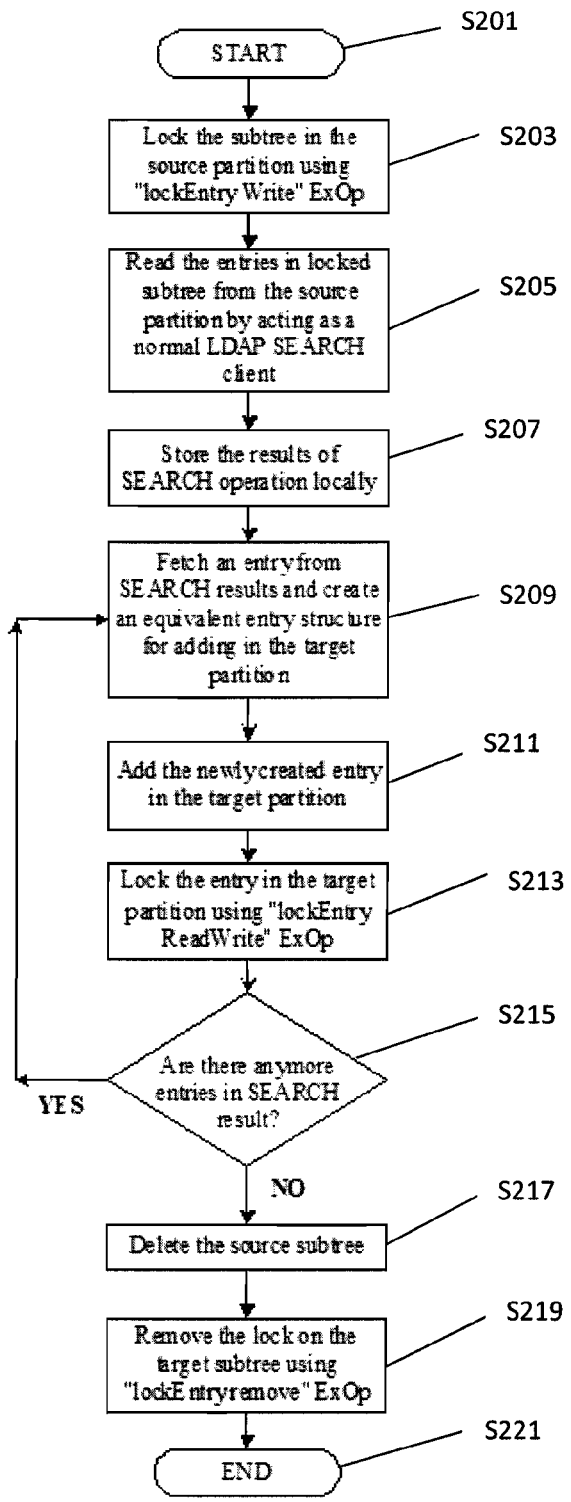
FIG. 2 is a flowchart of a method according to another embodiment of the invention.

A flowchart for the processing logic according to the method of an embodiment of the present invention is shown in FIG. 2.

In addition to starting (S201) and ending (S221), the control flow of this module is as follows:

1. Lock the subtree in the source partition server using "lockEntry Write" ExOp to disallow any modification to or deletion of entries in the subtree to be relocated by other LDAP clients while relocation of subtree is in progress (S203)

2. Read the entries in the locked subtree from the source partition server by acting as a normal LDAP SEARCH client (S205)

3. Store the results of SEARCH operation locally, for example, in memory or in a disk file (for example, a relocation tool) depending on the size of the subtree to be relocated. (S207)

4. Fetch an entry from the SEARCH results iteratively and create an equivalent entry structure that is to be added in the target partition server (S209)

5. Add the newly created entry in the target partition server (S211)

6. Lock the newly added entry in target partition server using "lockEntry ReadWrite" ExOp to disallow search/modification/deletion of the entry until relocation of whole subtree is complete (S213)

7. Check whether there are anymore entries in the SEARCH result (S215). If yes, go to step 4 above (S209), otherwise, go to step 8 (S217)

8. Delete the source subtree (S217)

9. Remove the lock on the entries in the target subtree using "lockEntry remove" ExOp (S219)

Accordingly, subtrees can be relocated from a source subtree to a destination subtree.

Suffix Subtree Relocation Module

The control flow of this module is the same as the "Subtree Relocation Module". But, before executing "Subtree Relocation Module", this module needs to add the suffix entry in the configuration file of the target partition server and issue a dynamic update using LDAP ExOp operation for this configuration entry so that the target partition server is aware of it.

Though the entries will be relocated from the source partition server to the target partition server keeping all the attribute-value pairs intact, the Access Central Lists (ACLs) will not be preserved because the ACLs of the entries in the source partition server may not make any sense in the target partition server. The attribute-value pairs are added to the equivalent entry in the target partition server in accordance with the attribute-value pairs in the entry in the source partition server and schema rules of the target partition server. Hence, while adding the entries in target partition server; default ACLs will be set in all of the servers.

Creating a newly formatted equivalent LDAP entry also includes adding attribute-value pairs in one of the plurality of entries in accordance with the attribute-value pairs in one of the plurality of entries in source partition server and schema rules of the target partition server.

Accordingly, the relocation method above is capable of relocating a part of source directory tree to a destination server as an independent suffix tree; relocating an entire suffix tree from a source server to a destination server as an independent suffix tree; and performing all relocation tasks online (i.e., without the need for bringing down either the source server or the destination server). This will enable LDAP clients to perform searches on all the directory trees involved in the relocation process while relocation is taking place.

While an embodiment of the invention has been described in terms of disclosed embodiments, those skilled in the art will recognize that the invention can be practiced with modification within the spirit and scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of online automatic relocation for an LDAP entry and one of a subtree and a partial subtree across directory partitions from one backend partition server to another partition server without bringing any of the servers down, the method comprising:

locking a plurality of entries in a source subtree of a source partition server using lockEntry Write ExOp online, without bringing any servers down, such that the plurality of entries can be searched, but not updated during a relocation process;

reading the plurality of entries in the locked source subtree of the source partition server by performing a client LDAP SEARCH operation to obtain entry results;

storing the entry results of the LDAP SEARCH operation locally in a relocation tool;

fetching the stored entry results from the LDAP SEARCH one at a time;

creating an equivalent newly formatted LDAP entry for each one of the LDAP SEARCH entry results for adding in a target partition server, wherein creating an equivalent newly formatted LDAP entry including modifying a distinguished name (DN) of each one of the LDAP SEARCH entry results in accordance with a target location of each equivalent LDAP entry in the target partition server, and adding attribute-value pairs in each equivalent LDAP entry in accordance with the attribute-pair value in each one of the LDAP SEARCH entry results in the source partition server and schema rules of the target partition server;

adding each newly created LDAP entry in the target partition server, wherein the adding is done by parsing command line parameters and binding to both the source partition server and the target partition server using credentials specified on a command line;

locking each newly created LDAP entry being one of a target subtree and a partial target subtree;

repeating the fetching, the adding, and the locking of newly created LDAP entries until there are no more entries in the LDAP SEARCH entry results; and removing the lock on the target subtree using lockEntry remove ExOp, if the scope of relocation is root, then updating a suffix entry as a newly added independent suffix subtree in a configuration of the target partition server and issuing dynamic updates of the configuration so that the newly added independent suffix subtree becomes active.

* * * * *